(12) United States Patent
Vassberg et al.

(10) Patent No.: US 6,843,452 B1
(45) Date of Patent: Jan. 18, 2005

(54) VARIABLE TRAILING EDGE GEOMETRY AND SPANLOAD CONTROL

(75) Inventors: John Charles Vassberg, Long Beach, CA (US); Robert D. Gregg, III, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/463,469

(22) Filed: Jun. 17, 2003

(51) Int. Cl.[7] ............................................... B64C 13/16
(52) U.S. Cl. ...................................... 244/203; 244/38
(58) Field of Search ............................ 244/203, 38, 39, 244/198, 206, 211, 212, 215, 217, 45 R, 113

(56) References Cited

U.S. PATENT DOCUMENTS

| | | | | |
|---|---|---|---|---|
| 1,879,618 A | * | 9/1932 | Baptiste | 244/203 |
| 2,043,275 A | * | 6/1936 | Weick | 244/216 |
| 2,147,360 A | * | 2/1939 | Zaparka | 244/212 |
| 2,158,686 A | * | 5/1939 | Barnhart | 244/203 |
| 2,381,681 A | * | 8/1945 | Maxwell | 244/211 |
| 2,523,427 A | * | 9/1950 | Hampshire | 244/203 |
| 2,620,150 A | * | 12/1952 | Atwood et al. | 244/82 |
| 3,447,761 A | * | 6/1969 | Wadleigh et al. | 244/15 |
| 3,586,267 A | * | 6/1971 | Ingelman-Sundberg | 244/203 |
| 4,542,868 A | | 9/1985 | Boyd | |
| 4,643,376 A | * | 2/1987 | Vanderhoeven | 244/198 |
| 4,858,852 A | | 8/1989 | Henne et al. | |
| 4,867,396 A | | 9/1989 | Wainfan | |
| 4,892,274 A | * | 1/1990 | Pohl et al. | 244/213 |
| 5,735,485 A | * | 4/1998 | Ciprian et al. | 244/113 |
| 6,164,599 A | | 12/2000 | Piening et al. | |
| 6,382,561 B1 | | 5/2002 | Brink | |
| 6,565,045 B1 | * | 5/2003 | Correge et al. | 244/215 |

OTHER PUBLICATIONS

Article "Application of Mini–Trailing–Edge Devices in the AWIATOR Project", H. Hansen undated.

* cited by examiner

*Primary Examiner*—Teri Pham Luu
*Assistant Examiner*—Stephen A. Holzen
(74) *Attorney, Agent, or Firm*—Harness Dickey & Pierce P.L.C.

(57) ABSTRACT

A mobile platform lift increasing system includes at least one wing-shaped structure having a leading edge, a trailing edge and a chord length perpendicularly measurable between the leading and trailing edges. A rotatable control surface is located near a trailing edge undersurface. The control surface length is approximately one to five percent of the chord length. A deployment device is positioned between the wing shaped structure and the control surface. The deployment device operably rotates the control surface through a plurality of positions ranging between an initial position and a fully deployed position. Wing lift is increased at speeds up to approximately transonic speed by continuously rotating the control surface to accommodate variables including mobile platform weight change from fuel usage.

22 Claims, 8 Drawing Sheets

VARIABLE TRAILING EDGE GEOMETRY AND SPANLOAD CONTROL

FIELD OF THE INVENTION

The present invention relates generally to lift producing aerodynamic surfaces and more specifically to the trailing edge geometry of lift producing aerodynamic surfaces.

BACKGROUND OF THE INVENTION

The lift producing structures such as wings, winglets, horizontal tails, canards etc. (hereinafter referred to as "wings") for an aircraft or any mobile platform, commonly have an airfoil shape which includes a rounded nose, a relatively thick forward cross section, a tapering section, and a relatively thin trailing edge cross section. Aircraft wings commonly include ailerons and/or flaps to modify airflow over the wing to change the aircraft attitude or to increase lift for take-off and landing procedures, respectively. Ailerons and flaps are typically a significant percentage (i.e., approximately 15% and 35%, respectively), of an aircraft wing chord (the forward to aft length of a wing), and limited in spanwise extent so are therefore not efficient for optimizing wing span load distributions during flight to maximize aircraft performance.

It is known that the area adjacent to the trailing edge can be modified to include fixed wedge-shape devices or fixed extended flaps to improve lift and reduce the coefficient of drag for the wing. These fixed devices commonly have a length of approximately 5% of the wing chord. The addition of these devices can increase fuel efficiency at normal operating speeds of the mobile platform. The use of these devices, however, results in increased drag when operating outside the normal operating speed, because the fixed angle that the device makes from the plane of the trailing edge of the wing is optimized for the normal cruise speed, and therefore provides a less than optimum angle for operation at other than normal cruise speeds.

One known solution to the fixed flap design is to interlock a set of rotatable ribs to define the chord of an aircraft wing. The plurality of ribs are each rotatable such that the overall geometry of the wing can be modified during flight. In operation, either the entire wing deflects or a portion of the wing having one or more ribs deflects. The disadvantage of this design is the tradeoff between the additional weight required for the additional mechanical devices to modify the wing shape with the increased efficiency of the wing.

It is therefore desirable to overcome the disadvantages and drawbacks of the known airfoil designs having fixed trailing edge geometries or multiple articulated wing sections.

SUMMARY OF THE INVENTION

According to a preferred embodiment of the present invention, a lift producing system for a mobile platform includes at least one wing-shaped structure having a leading edge, a trailing edge and a chord length measurable between the leading and trailing edges. At least one control surface is rotatably disposed approximate the trailing edge. The control surface has a length approximately one to five percent of the chord length. A deployment device is disposed between the wing-shaped structure and the control surface. The deployment device is operable to rotate the control surface through a plurality of positions ranging between an initial position approximately parallel to the wing-shaped structure and a fully deployed position.

According to another preferred embodiment, the control surface includes a forward facing edge forming an axis of rotation for the control surface, and a distally extending edge. A mechanical deployment device is disposed between the wing shaped structure and the control surface which is operable to declinate the control surface about the axis of rotation from an initial position having the control surface approximately parallel to the wing, to a deployed position, and returning the control surface to the initial position.

In still another preferred embodiment, the deployment device includes a fluid actuator having flexible walls. A pressurized fluid is pumped or input into the fluid actuator, expanding the fluid actuator to declinate a control surface over a variable operating range. Removing fluid from the fluid actuator returns the control surface to the initial position.

In yet another preferred embodiment of the present invention, the control surface is provided of a flexible, elastic material. This design provides a curved surface shape as the control surface is deployed.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Reference to use on an aircraft wing is generally made herein, however, the invention is not limited to aircraft or wing use.

Figure 1:
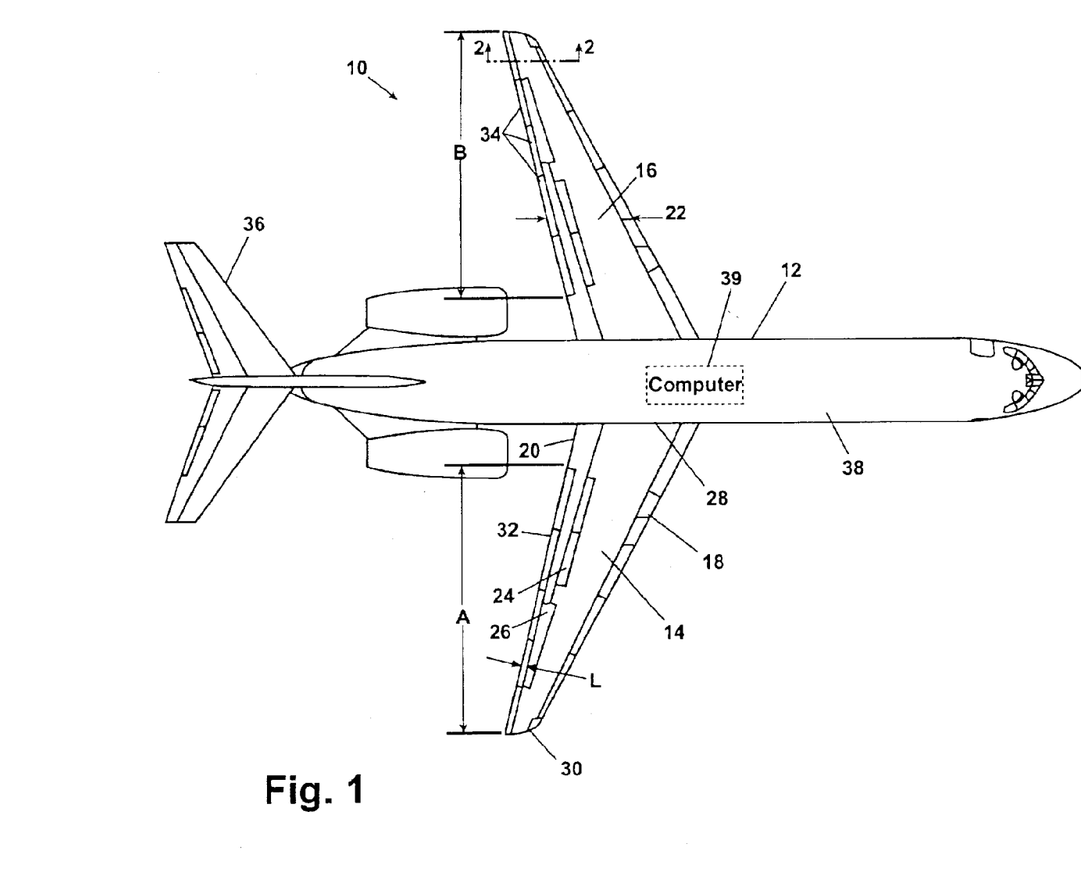
FIG. 1 is a plan view of a common two engine commercial aircraft having the main flight wings modified to incorporate the variable trailing edge geometry of the present invention.

Referring to FIG. 1, a variable trailing edge system 10 in accordance with a preferred embodiment of the present invention is shown. An aircraft 12 includes a starboard wing 14 and a port wing 16. Each of the wings include a leading edge 18 and a trailing edge 20. A chord length 22 is identified for the port wing 16, but is common to either wing. A plurality of chord lengths 22 can exist for a given wing because the chord length 22 is determined at a cross section taken through the wing, and the tapering wing design of many commercial aircraft (such as the 2-engine design shown in FIG. 1) provides a changing cross section as the wing tapers down in length from the inboard end to the outboard end. Common aircraft wings also include at least one aileron 24 and at least one flap 26.

Each of the starboard wing 14 and the port wing 16 are connected to the aircraft 12 at a side-of-body 28. In the configuration shown in FIG. 1, the wings taper from the side-of-body 28 to a wing tip 30. A control surface area 32 is shown for the starboard wing 14. The control surface area 32 represents the location on the starboard wing 14 adjacent to the trailing edge 20 having at least one individual control surface 34 of the present invention disposed thereon at an undersurface of the trailing edge 20. In a preferred embodiment, a plurality of individual control surfaces 34, i.e, those shown at an aft facing edge of the port wing 16 and having a length "L", are disposed on an aircraft wing. Each of the individual control surfaces 34 can be operated in tandem or can be operated individually as will be described further herein. One or more individual control surfaces 34 are disposed within each of the variable trailing edge regions "A" and "B". In a preferred embodiment, the control surfaces are disposed from the wing tip 30 to a position spaced outboard from the side-of-body 28 for each of the starboard wing 14 and the port wing 16. The control surfaces can also be positioned adjacent to the side-of-body 28, depending on wing structure and amount of wing load desired.

The aircraft 12 also includes a horizontal stabilizer 36 attached to an aft end of a fuselage 36. Control surfaces of the present invention can also be disposed on the horizontal stabilizer 36 in similar positions adjacent to the trailing edge of the horizontal stabilizer. The greatest wing load benefit using control surfaces of the present invention, however, is achieved when the control surfaces are disposed at the positions shown on the starboard wing 14 and the port wing 16, respectively.

Operational control of the individual control surfaces 34 of the present invention is preferably performed using a computer 39. The computer 39 collects platform data including the remaining on-board fuel, passenger weight, air speed, altitude, and baggage weight, etc. The computer 39 is pre-programmed to vary the declination angle of each individual control surface 34 to adjust an overall wing aerodynamic load distribution for both wings based on flight conditions, current aircraft weight and structural limits. The computer 39 directs the operation of hydraulic or air systems (not shown) to position each individual control surface 34. Hydraulic and air systems are commonly known and are therefore not further discussed herein. It is preferable to operate the individual control surfaces "automatically" using the computer 39, wherein continuous or intermittent calculations of the computer 39 signal either continuous or intermittent position changes to the actuators (discussed in reference to FIG. 2) of the individual control surfaces 34. In the event of a power failure or computer failure, it is also desirable for the actuators to return the control surfaces 34 to a safe (low wing bending moment) position.

Figure 2:
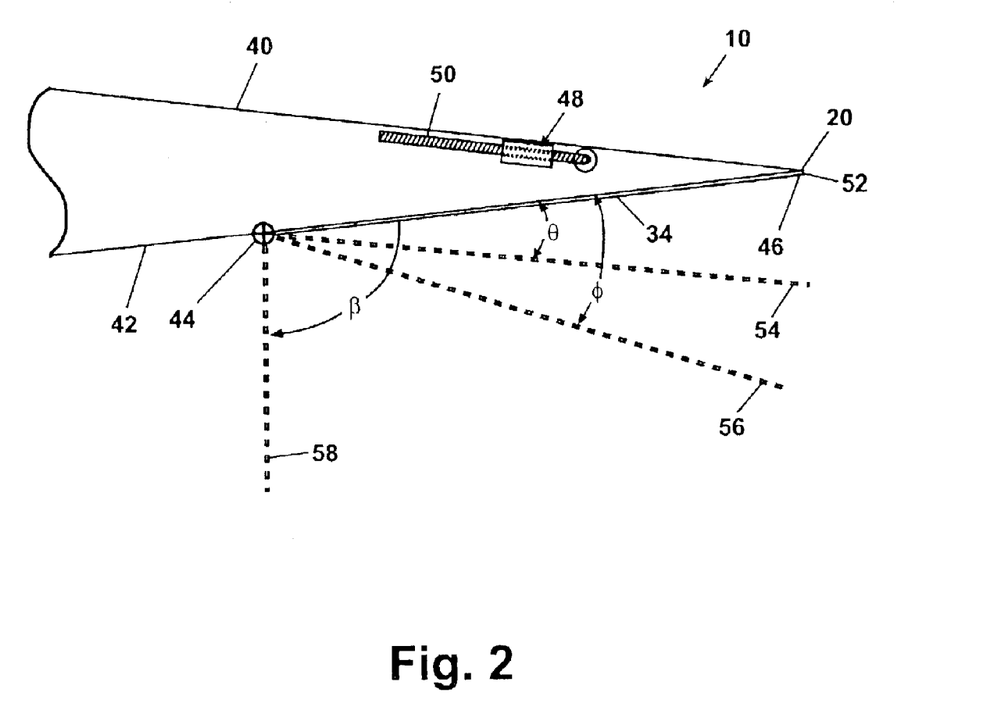
FIG. 2 is a partial cross section view taken at Section 2 of FIG. 1 showing a potential range of motion for a control surface of the present invention.

Referring now to FIG. 2, one of the individual control surfaces 34 of the port wing 16 is further detailed. The individual control surface 34 is disposed adjacent to the trailing edge 20 such that the individual control surface 34 is positioned below a wing upper surface 40 and generally parallel with a wing lower surface 42. The individual control surface 34 is rotatably hinged to the wing lower surface 42 at a control surface connection end 44. A control surface distal end 46 is positioned immediately adjacent to the trailing edge 20 in a fully upright position of the individual control surface 34. An exemplary actuator 48 having a worm drive gear 50 is connectably disposed to the individual control surface 34 and fixedly disposed at the wing upper surface 40. The actuator 48 rotates and guides the worm drive gear 50 such that the individual control surface 34 rotates about the control surface connection end 44 between a control surface initial position 52 through a varying degree of declination positions.

From the control surface initial position 52, several exemplary positions are illustrated. A control surface intermediate position 54 having an angle θ is shown. A control surface deployed position 56 having an angle φ is also shown. The control surface deployed position 56 represents a normal operating declination position for the control surface 34. The deployed position 56 is predetermined for an individual aircraft depending upon the wing load desired and the normal operating speed of the aircraft 12. A control surface maximum deployed position 58 having an angle β is also shown. The control surface maximum deployed position 58 can be as high as approximately 90 degrees measured from the control surface initial position 52. The control surface maximum deployed position 58 generates a maximum lift from any one of the individual control surfaces 34. During normal operation of the aircraft, the control surface deployed position 56, or normal operating range for the individual control surface 34, has an angle φ of approximately 15–25 degrees measured from the control surface initial position 52. The spanwise distribution of angle φ represents the optimum operating angle positions to reduce an aircraft fuel consumption rate without exceeding structural limits. This optimum distribution varies over the course of the flight as fuel is consumed.

Figure 3:
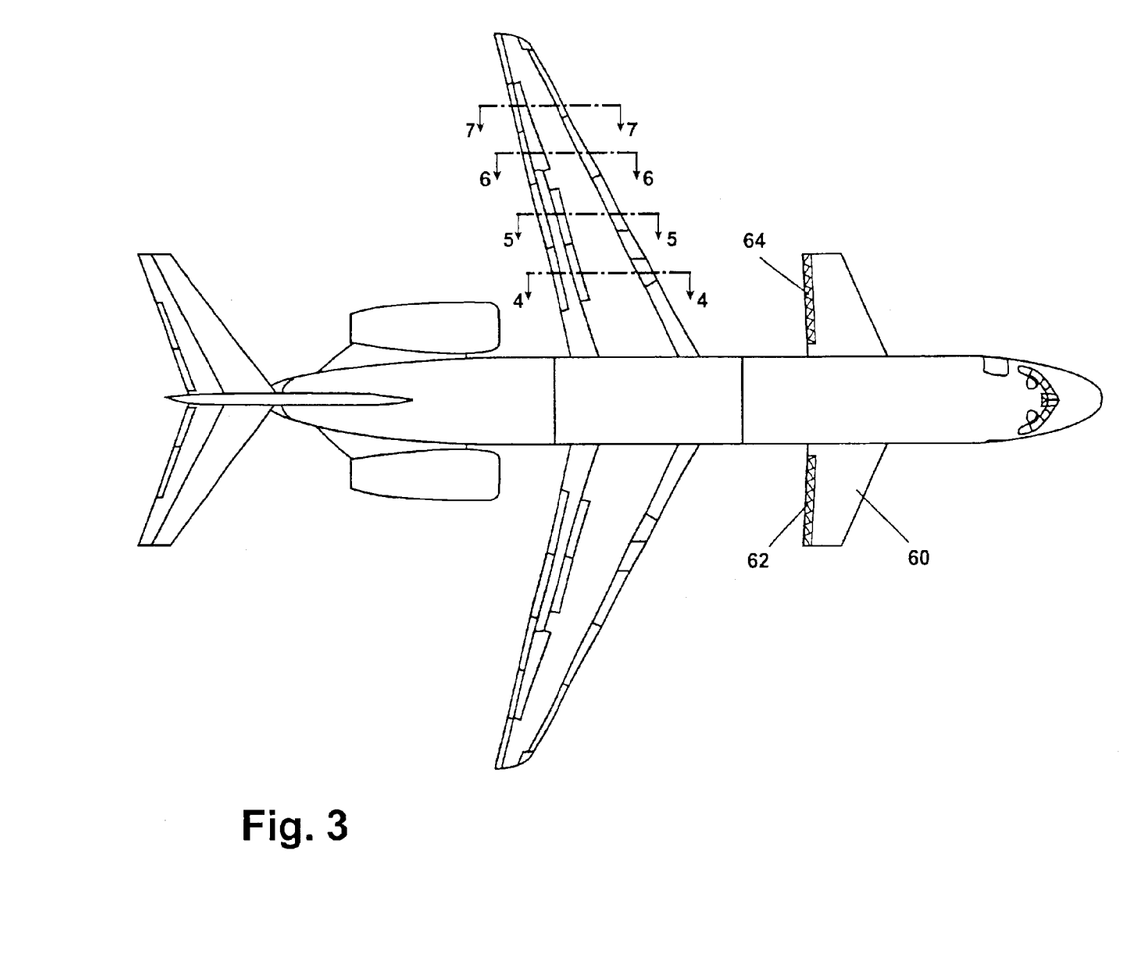
FIG. 3 is a modification of the plan view of FIG. 1 showing a canard wing installed on an aircraft, and includes an arrangement of four control surfaces of the present invention deployed on each main wing.

As best shown in FIG. 3, the variable trailing edge system of the present invention can also be disposed on a canard wing 60. The canard wing 60 includes a starboard control surface 62 and a port control surface 64. Each of the starboard control surface 62 and the port control surface 64 can include one or more individual control surfaces (e.g., individual surfaces 34 as noted previously in reference to FIG. 1).

Figure 4:
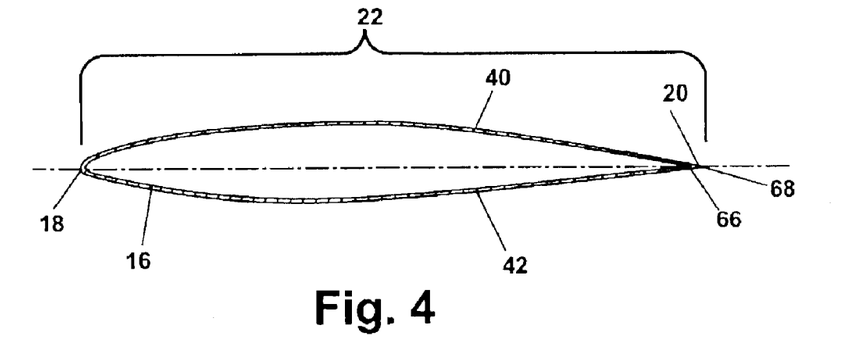
FIG. 4 is a sectioned elevation view taken at Section 4 of FIG. 3 showing a control surface in an initial position fully upright against the trailing edge of the wing.
Figure 5:
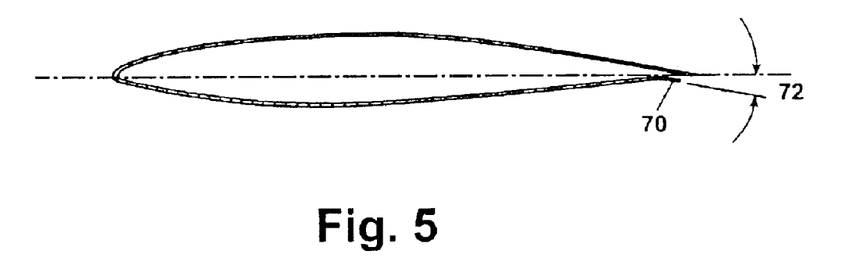
FIG. 5 is a sectioned elevation view taken at Section 5 of FIG. 3 showing a control surface in a partially declinated position.
Figure 6:
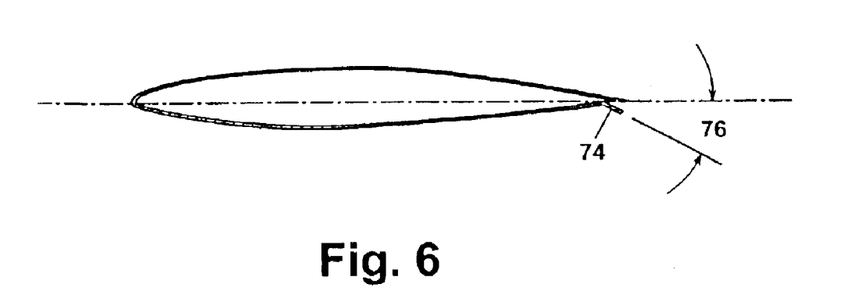
FIG. 6 is sectioned elevation view taken at Section 6 of FIG. 3 showing a control surface in an intermediate position.
Figure 7:
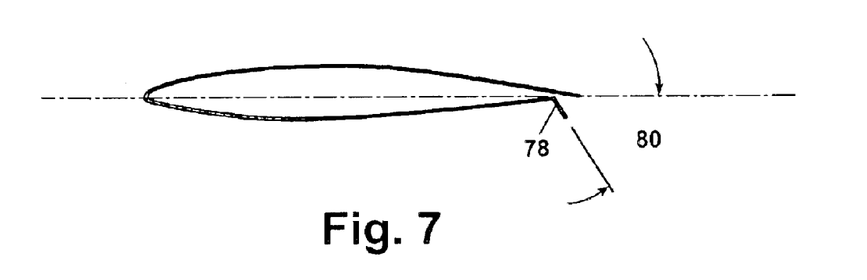
FIG. 7 is a sectioned view taken at Section 7 of FIG. 3 showing a control surface in a normal deployed position for maximum load increase on the wing surface.
Figure 8:
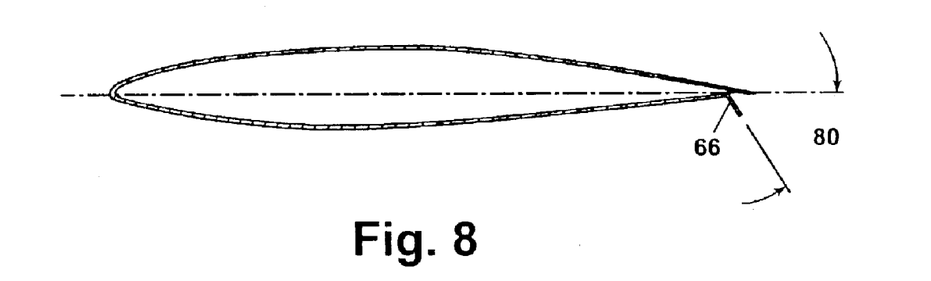
FIG. 8 is the sectioned elevation view of FIG. 4 modified to show the control surface in the normal deployed position.
Figure 9:
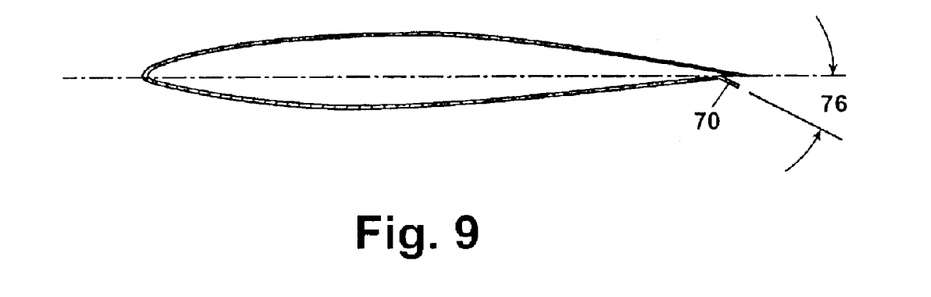
FIG. 9 is the sectioned elevation view of FIG. 5 modified to show the control surface in an intermediate declinated position.
Figure 10:
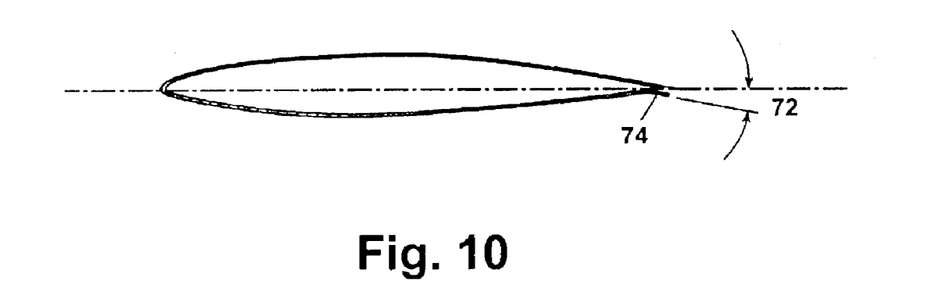
FIG. 10 is the sectioned elevation view of FIG. 6 modified to show the control surface in a partially declinated position.
Figure 11:
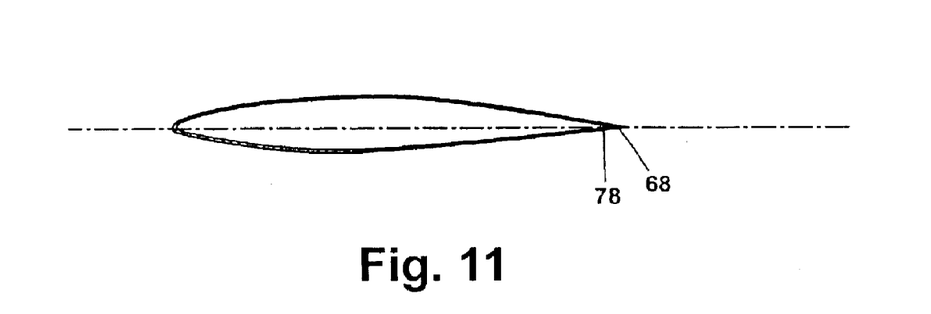
FIG. 11 is the sectioned elevation view of FIG. 7 modified to show the control surface in the initial or fully upright position adjacent to the wing structure.

As best described with reference to FIGS. 4–11, individual chord lengths taken through the port wing 16 demonstrate exemplary operating ranges for individual control surfaces of the present invention. FIG. 4 typifies a chord 22 measurable between the leading edge 18 and the trailing edge 20. The wing upper surface 40 and the wing lower surface 42 are also shown representing the typical airfoil shape of an aircraft's wing.

FIGS. 4–7 demonstrate several exemplary positions for control surfaces for an aircraft during an in-flight condition wherein the weight of the aircraft decreases from its maximum takeoff weight and a modified induced wing load is desirable. To optimize wing load distribution during in-flight conditions, a first control surface 66 closest to the side-of-body 28 is in a fully upright or initial position 68. A second control surface 70 adjacent to the control surface 66 is in a deployment position 72. A third control surface 74 is in a deployment position 76. A fourth control position 78 is in a normal deployment position 80 corresponding to the control surface deployed position 56 identified in FIG. 2. FIGS. 4–7 provide an exemplary configuration of control surfaces during an in-flight condition. The wing load distribution is optimized by deployment of individual control surfaces 66, 70, 74 and 78 as shown having the control surfaces adjacent to the wing tip 30 at the maximum deployed (i.e., declinated) position and each control surface from the wing tip 50 inboard positioned at a decreasing angle of deployment.

Referring now to FIGS. 8–11, an exemplary takeoff condition for an aircraft wing is shown. In the takeoff condition, the aircraft is at its maximum weight due to maximum passenger, baggage, and fuel volumes. For the takeoff condition, the individual control surfaces are positioned opposite to the control surface positions for the aircraft wing during in-flight conditions. Therefore, in FIG. 8, the first control surface 66 is deployed in a normal deployment position 80 corresponding to the control surface deployed position 56 of FIG. 2. Each further outboard control surface has a decreasing declination angle, until, at the fourth control surface 78, the deployment position equates to the initial position 68. The second control surface 70 (shown in FIG. 9) is therefore positioned in the deployment position 76 and the third control surface 74 (shown in FIG. 10) is positioned in the deployment position 72. In the exemplary condition shown in FIGS. 8–11, outboard wing loading is reduced and lift generated by the inboard control surfaces is increased, reducing the wing root-bending moment when the aircraft is at its maximum weight.

Referring to both FIGS. 1 and 4, in one preferred embodiment of the present invention, the individual control surfaces 34 have the length "L" for each application. The length "L" varies depending upon the wing load desired, between approximately 1% to approximately 5% of the chord 22 length. In a further preferred embodiment of the present invention, the length "L" can also vary for each individual control surface 34 for a given wing. The length "L" can also vary based on the projected platform operating speed.

Figure 12:
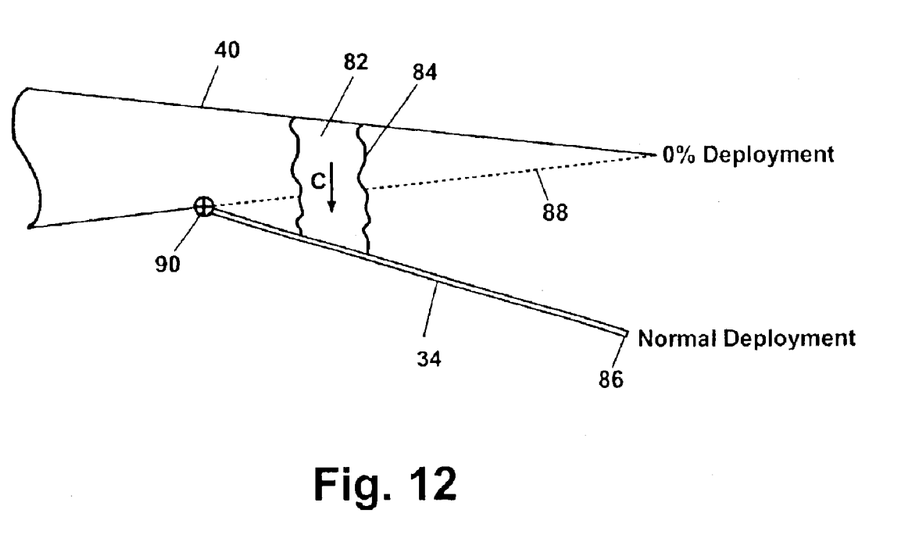
FIG. 12 is a sectioned view similar to FIG. 2 showing an alternate embodiment actuator of the present invention.

As shown in FIG. 12, another preferred embodiment for actuating a control surface of the present invention is shown. A fluid actuator 82 is disposed between the wing upper surface 40 and the individual control surface 34. The fluid actuator 82 includes a flexible wall 84 containing a fluid such as air or hydraulic fluid (not shown) which is pumped or otherwise input into the fluid actuator 82 to expand the fluid actuator in the deployment direction "C". This fluid is removed from the fluid actuator 82 through one or more bleed devices (not shown) to retract the individual control surface 34 from the normal deployment position 36 to the control surface initial position 88. Similar to the actuator 48 shown in FIG. 2, the fluid actuator 82 causes the individual control surface 34 to rotate about a rotation axis 90. The rotation axis 90 is provided by a hinge or similar device disposed in the wing.

Figure 13:
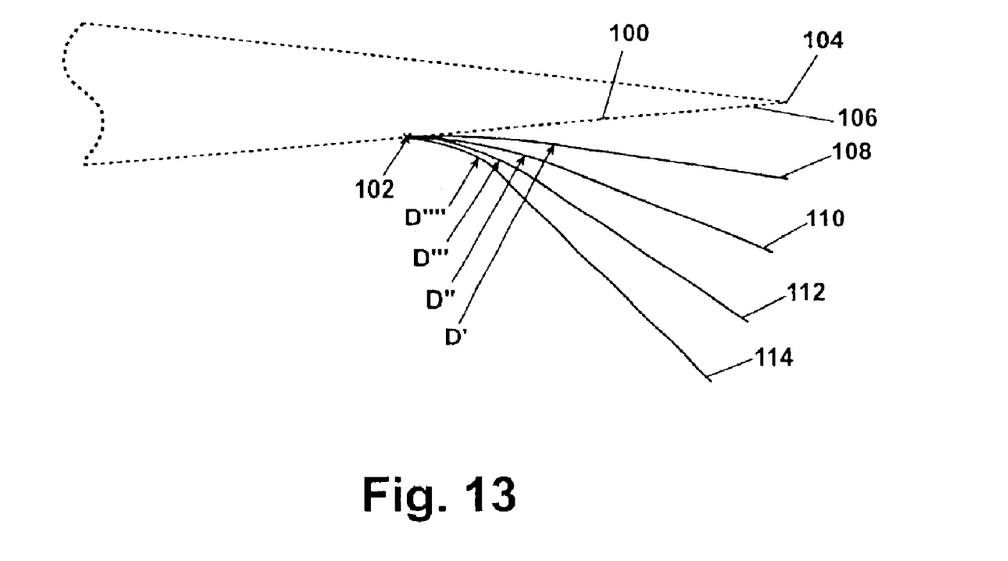
FIG. 13 is a partial cross section view of an aircraft wing identifying an alternate embodiment of a flexible control surface of the present invention.

Referring next to FIG. 13, yet another preferred embodiment of the present invention having a flexible control surface 100 is detailed. The flexible control surface 100 includes a fixed end 102 and a distal end 104. The flexible control surface 100 is made from an elastic material such that after the deflection force is removed, the control surface 100 returns to its normal non-deflected position. In operation, the flexible control surface 100 is positioned in a similar manner to the individual control surfaces 34 with actuators (not shown) similar to the actuator 48 or the fluid actuator 82.

From an initial position 106, the flexible control surface 100 deflects about a range of bend radii "D" to various operating positions. In a first rotation position 108, the flexible control surface 100 includes a bend radius D'. In a second rotation position 110, the flexible control surface 100 includes a bend radius D". In third rotation position 112, the flexible control surface 100 includes a bend radius D'". Finally, in the deployed position 114, the flexible control surface 100 has a bend radius D"". It will be evident to a skilled practitioner that the flexible control surface 100 can have a plurality of rotation positions and bend radii. The flexible control surface 100 provides a smoother transition surface area for airflow compared to the rigid plate surface of the individual control surface 34 (shown in FIG. 2). The fixed end 102 of the flexible control surface 100 is preferably provided as a fixed attachment to the wing structure. The fixed end 102 of the flexible control surface 100 can also be hinged similar to the individual control surface 34.

Figure 14:
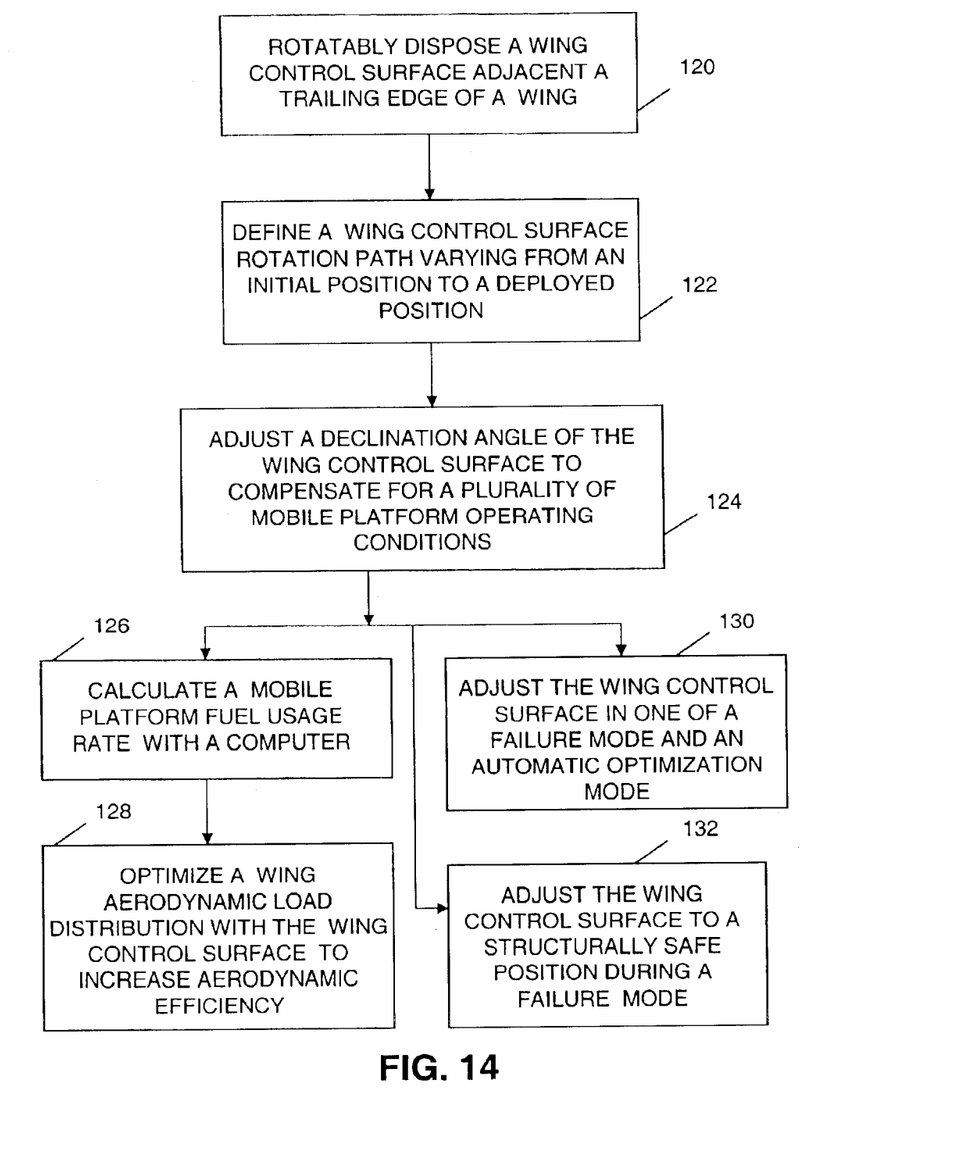
FIG. 14 is a diagrammatic presentation of the method steps to vary an airfoil trailing edge geometry according to the present invention.

Referring to FIG. 14, the method steps to operate a wing trailing edge control surface of one preferred embodiment the present invention are described. In a step 120, a wing control surface adjacent to a trailing edge of a wing is rotatably disposed to the wing. At a step 122, a wing control surface rotation path is defined varying from an initial position to a deployed position. In a following step 124, one or more mobile platform operating conditions define a declination angle of the wing control surface. In a first parallel step 126, a mobile platform fuel usage rate is calculated using a computer. In a following step 128, a wing aerodynamic load distribution is optimized to increase aerodynamic efficiency by taking advantage of increased structural margins which correspond to a decreasing fuel weight. In a second parallel step 130, the wing control surface is adjusted in one of a failure mode and an automatic optimization mode. In a third parallel step 132, the wing control surface is adjusted to a structurally safe position during a failure mode.

The variable trailing edge system of the present invention offers several advantages. The individual control surfaces of the present invention can be individually actuated or group actuated to adjust the structural load of an aircraft wing. A plurality of actuator designs can be used to actuate the control surfaces. The control surfaces of the present invention can vary in length between approximately 1% to approximately 5% of the chord length of the wing. The control surfaces can also vary along the span of each wing. By controlling the declination angle of the control surfaces of the present invention, aircraft flight conditions such as decreasing weight due to fuel usage can be compensated for. As the aircraft weight decreases in flight, the outboard wing load can be increased using the control surfaces of the present invention and an overall fuel consumption for the aircraft can be reduced.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A spanload modification system for a mobile platform, comprising:
   at least one wing-shaped structure having a leading edge, a trailing edge, and an aileron, and a chord length measurable between said leading and trailing edges; and
   at least one control surface disposed on said wing-shaped structure having a first end rotatably disposed about a point forward of said trailing edge, a second distal end, and a length measurable between said first end and said second distal end ranging between approximately one to approximately five percent of said chord length;
   wherein each said control surface operably rotates about said first end through a plurality of positions ranging between an initial position having said control surface approximately parallel to said wing-shaped structure and a fully deployed position having said second end angularly displaced from said initial position.

2. The system of claim 1, comprising: a deployment device disposed between said wing-shaped structure and said control surface; wherein said control surface comprises a rigid plate; wherein said deployment device is operable to rotate said rigid plate through said plurality of positions.

3. The system of claim 2, comprising a control system in communication with said deployment device capable of continuously signaling each of a plurality of position changes for said deployment device.

4. The system of claim 3, wherein said control system comprises a data set including an altitude, a speed, a weight, a distance traveled and a wing-shaped structural load of said mobile platform.

5. The system of claim 4, comprising:
   said weight of said mobile platform corresponds to a continuously decreasing mobile platform remaining fuel; and
   said control system operably generates a continuously variable declination angle for said control surface to compensate for said continuously decreasing remaining fuel.

6. The system of claim 4, comprising a maximum deployment position of said control surface determinable from said data set.

7. A variable trailing edge geometry flight surface for an aircraft, comprising:
   a plurality of wings each having a leading edge, a trailing edge, at least one flap, at least one aileron, and a chord length perpendicularly measurable between said leading and trailing edges;
   at least one control surface connectably disposed adjacent an undersurface of said trailing edge between any one of said at least one flap or said at least one aileron and said trailing edge, said at least one control surface having a length measurable along said chord length ranging between approximately one to approximately five percent of said chord length;
   said control surface including a forward facing edge forming an axis of rotation for said control surface and a distally extending edge; and
   a deployment device connectably disposed to said control surface and operable to move said control surface about said axis of rotation from an initial position to a deployed position, and return said control surface to said initial position.

8. The flight surface of claim 7, comprising a control surface nominal rotation angle ranging from said initial position having an angle with respect to said wing of approximately zero degrees to said deployed position having an angle of up to 90 degrees below said wing.

9. The flight surface of claim 7, comprising:
   a control surface maximum deployed position; and
   a control surface maximum rotation angle of approximately 90 degrees below said wing measurable between said initial position having an angle with respect to said wing of approximately zero degrees and said maximum deployed position.

10. The flight surface of claim 7, wherein said deployment device comprises:
    an actuator disposed on one of said plurality of wings or said control surface; and
    a rod positionable by said actuator, said rod contacting an opposite one of said one wing and said control surface having said actuator disposed thereon, to rotate said control surface.

11. The flight surface of claim 9, wherein said deployment device comprises an inflatable chamber having a diameter varying between a minimum diameter corresponding to said control surface initial position and a maximum diameter corresponding to said control surface maximum deployed position.

12. The flight surface of claim 7, comprising:
    said at least one wing includes a pair of opposed wings; and
    said at least one control surface includes a plurality of independent control surfaces arranged in an edge adjacent configuration on each of said pair of wings.

13. The flight surface of claim 12, wherein said deployment device comprises a plurality of individual devices each in communication with one of said plurality of control surfaces.

14. The flight surface of claim 13, comprising said edge adjacent configuration including one of said independent control surfaces adjacent a tip of each said wing.

15. The flight surface of claim 13, comprising said plurality of control surfaces of each said wing being operable as a single group from an underside of said trailing edge of said wing.

16. The flight surface of claim 13, comprising said plurality of control surfaces of each said wing being individually operable as a plurality of separate groups from an underside of said trailing edge of said wing.

17. A method of varying a trailing edge geometry of a mobile platform wing, comprising the steps of:
    rotatably disposing a wing control surface adjacent an aft, lower portion of a platform wing;
    positioning said wing control surface between any one of a flap and an aileron connected to said wing and a wing trailing edge;
    defining a wing control surface rotation path variable between an initial position and a deployed position; and
    continually adjusting a declination angle of the wing control surface throughout said rotation path to compensate for a plurality of mobile platform operating conditions.

18. The method of claim 17, comprising:
    continuously calculating a mobile platform fuel usage rate; and
    optimizing a wing aerodynamic load distribution with the wing control surface for a decreasing mobile platform weight due to the fuel usage rate.

19. The method of claim 17, comprising modifying the wing control surface declination angle to compensate for each of a mobile platform altitude, speed, weight, distance traveled and wing-shaped structural load.

20. The method of claim 17, comprising adjusting the wing control surface in one of a failure mode and an automatic mode.

21. The method of claim 17, comprising operating the control surface for a mobile platform speed up to approximately a transonic speed.

22. A variable trailing edge geometry flight surface system for an aircraft wing, comprising:

a wing having a leading edge, a trailing edge, a flap, an aileron, and a chord length measurable between the leading and trailing edges;

a control surface positionable between any one of the flap or the aileron and the trailing edge, the control surface having a length defining a portion of the chord length, the length ranging between approximately one to approximately five percent of the chord length;

a forward facing edge of the control surface defining an axis of rotation of the control surface;

a deployment device connectable to the control surface and operable to move the control surface about the axis of rotation; and a computer in communication with the deployment device, the computer operable to identify a wing load distribution and vary the wing load distribution by controlling operation of the deployment device.

\* \* \* \* \*